United States Patent
Kondo et al.

(10) Patent No.: US 6,691,008 B2
(45) Date of Patent: Feb. 10, 2004

(54) STEERING CONTROL APPARATUS FOR A VEHICLE

(75) Inventors: Satoshi Kondo, Utsunomiya (JP); Shinnosuke Ishida, Tokorozawa (JP); Jun Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/231,165

(22) Filed: Aug. 30, 2002

(65) Prior Publication Data

US 2003/0045983 A1 Mar. 6, 2003

(30) Foreign Application Priority Data

Sep. 4, 2001 (JP) .................................... P2001-267796
May 9, 2002 (JP) .................................... P2002-134445

(51) Int. Cl.[7] ............................................ B61F 23/00
(52) U.S. Cl. ............................. 701/41; 701/42; 701/43; 180/40; 340/438
(58) Field of Search ................................. 701/41, 42, 43; 180/410, 412, 413, 422, 446; 340/438, 439, 575, 576

(56) References Cited

U.S. PATENT DOCUMENTS 6,053,270 A * 4/2000 Nishikawa et al. ......... 180/168
6,324,452 B1 * 11/2001 Ikegaya ....................... 701/41

* cited by examiner

*Primary Examiner*—Marthe Y. Marc-Coleman
(74) *Attorney, Agent, or Firm*—Arent Fox Kintner Plotkin & Kahn, PLLC

(57) ABSTRACT

Whether a driver is driving intentionally is determined rapidly and accurately when steering control is performed such that a vehicle travels along recognized travel partitioning lines. A torque value deviation absolute value is calculated using the absolute value of a difference between the torque value from the previous processing and the torque value from the current processing, and is stored in a ring buffer. A torque value deviation sum value is calculated by adding all the torque value deviation absolute values stored in the ring buffer, and when a state in which the torque value deviation sum value is equal to or less than a predetermined driving intention determination threshold continues for a predetermined first threshold time (for example, several seconds; e.g. 5 seconds) or longer, it is determined that there is a decrease in the driving intention.

36 Claims, 10 Drawing Sheets

STEERING CONTROL APPARATUS FOR A VEHICLE

BACKGROUND OF THE INVENTION

1. Field of the Invention

The present invention relates to a steering control apparatus for a vehicle that recognizes travel partitioning lines on a road based on images obtained by photography using a camera, and performs steering control such that the vehicle travels along the travel partitioning lines.

2. Description of the Related Art

Conventionally, as in the steering control apparatus for a vehicle disclosed in Japanese Unexamined Patent Application, First Publication No. 2001-10519, a steering control apparatus for a vehicle is known that, by performing image processing on images obtained from a vehicle-mounted camera that photographs a travel route, detects lines on the road (for example, travel partitioning lines such as white lines) and provides assistance to the steering torque input by a driver such that the vehicle is made to travel along these lines.

In this steering control apparatus for a vehicle settings are made such that, based on the amount of change in the steering torque input by the driver and on an amount of lateral slippage from a line on the road to the vehicle position, it is determined whether the driver is performing the driving action intentionally. Moreover, in accordance with the result of the determination as to whether the driving action is intentional, it is decided whether it is possible to output a warning or to provide assistance to the steering torque.

However, in a steering control apparatus for a vehicle according to the above related art, when calculating the amount of change in the steering torque input by the driver, firstly, measurement of the temporal change in the steering torque over a predetermined sampling period (for example, over several seconds) is started, and whether the driving action is intentional is determined after the temporal change amount in the steering torque within this sampling period has been calculated. Therefore, the problem exists that it is not possible to determine whether the driving action is intentional during this sampling period. Namely, if the time required to determine whether the driver is driving intentionally is lengthened, then the concern arises that appropriate steering control that corresponds to the intention of the driver cannot be performed during the period that this determination processing is continuing.

SUMMARY OF THE INVENTION

The present invention was conceived in view of the above circumstances and it is an object thereof to provide a steering control apparatus for a vehicle that enables appropriate steering control to be performed by rapidly and accurately determining whether a driver is intentionally performing a driving action when performing steering control such that a vehicle travels along recognized travel partitioning lines.

In order to solve the above problems and achieve the objects of the present invention, the first aspect of the present invention is a steering control apparatus for a vehicle, comprising: an actuator (for example, the motor 20 in the embodiment described below) that drives a steering mechanism (for example, the manual steering power generating mechanism 16 in the embodiment described below) capable of steering wheels (for example, the steering wheels 19 and 19 in the embodiment described below) of the vehicle; a torque detector (for example, the torque sensor 22 in the embodiment described below) that detects steering torque input by a driver; a travel route recognizing section (for example, the camera 25 and the image recognition processing section 26 in the embodiment described below) that recognizes a travel route of the vehicle; and a steering assistance section (for example, the EPS control apparatus 24 in the embodiment described below) that outputs a signal that drives the actuator such that the vehicle travels along the travel route recognized by the travel route recognizing section, wherein the steering control apparatus for a vehicle is provided with: a steering torque change state calculation section (for example, step S04 in the embodiment described below) that calculates one of a moving integral value of an amount of change in the steering torque detected by the torque detector and a moving integral value of a squared value of an amount of change in the steering torque detected by the torque detector; a driving intention determination section (for example, steps S05 to S10 in the embodiment described below) that determines whether there has been a decrease in the driving intention of the driver based on a result of a calculation by the steering torque change state calculation section; a notification section (for example, the warning apparatus 34 in the embodiment described below) that outputs a warning to the driver; and an execution section (for example, the LKAS control apparatus 23 in the embodiment described below) that executes at least one of stopping the driving of the actuator by the steering assistance section and outputting the warning by the notification section when it is determined by the driving intention determination section that there has been a decrease in the driving intention.

According to the steering control apparatus for a vehicle having the above structure, for example, in a processing sequence that is executed at regular predetermined intervals, the steering torque change state calculation section calculates the absolute value of the difference between the previous value of the steering torque from the previous processing that was detected by the torque detector and the current value of the steering torque in the current processing that is detected by the torque detector, and stores each one as time series data. The driving intention determination section determines whether there has been a decrease in the driving intention of the driver in accordance with a moving integral value that is obtained by adding absolute values of the above differences or squared values of the above differences that have been stored for a predetermined number of times in the past up until the current processing.

Namely, it is possible to calculate a moving integral value of an amount of change in the steering torque detected by the torque detector, or to calculate a moving integral value of the squared value of the amount of change in the steering torque simply by using straightforward and rapid processing that entails simply adding a new data calculated in the current processing to the time series data for the past stored previously. In addition, it is possible to determine immediately whether there has been a decrease in the driving intention of the driver based on these moving integral values. Furthermore, it is possible to determine simply and accurately whether there has been a decrease in the driving intention of the driver.

Moreover, in the steering control apparatus for a vehicle of the present invention, the driving intention determination section may determine that there has been a decrease in the driving intention when a state in which the result of a calculation by the steering torque change state calculation section is less than or equal to a predetermined value continues for a predetermined time or longer.

According to the steering control apparatus for a vehicle having the above described structure, the driving intention determination section does not determine that there has been a decrease in the driving intention simply when the result of a calculation by the steering torque change state calculation section is equal to or less than a predetermined value, but makes this determination when this state has continued over a predetermined time or longer. As a result, it is possible to reliably determine whether there has been a decrease in the driving intention, and to perform even more appropriate steering control.

The second aspect of the present invention is a steering control apparatus for a vehicle, comprising: an actuator (for example, the motor 20 in the embodiment described below) that drives a steering mechanism (for example, the manual steering power generating mechanism 16 in the embodiment described below) capable of steering wheels (for example, the steering wheels 19 and 19 in the embodiment described below) of the vehicle; a torque detector (for example, the torque sensor 22 in the embodiment described below) that detects steering torque input by a driver; a travel route recognizing section (for example, the camera 25 and the image recognition processing section 26 in the embodiment described below) that recognizes a travel route of the vehicle; and a steering assistance section (for example, the EPS control apparatus 24 in the embodiment described below) that outputs a signal that drives the actuator such that the vehicle travels along the travel route recognized by the travel route recognizing section, wherein the steering control apparatus for a vehicle is provided with: a steering torque difference calculation section (for example, step S45 in the embodiment described below) that calculates a difference between a maximum value and a minimum value in a predetermined period of the steering torque detected by the torque detector; a driving intention determination section (for example, steps S46 to S49 and steps S09 and S10 in the embodiment described below) that determines whether there has been a decrease in the driving intention of the driver based on a result of a calculation by the steering torque difference calculation section; a notification section (for example, the warning apparatus 34 in the embodiment described below) that outputs a warning to the driver; and an execution section (for example, the LKAS control apparatus 23 in the embodiment described below) that executes at least one of stopping the driving of the actuator by the steering assistance section and outputting the warning by the notification section when it is determined by the driving intention determination section that there has been a decrease in the driving intention.

According to the steering control apparatus for a vehicle having the above described structure, for example, in a processing sequence that is executed at regular predetermined intervals, the steering torque difference calculation section sets the values of the steering torque detected by the torque detector as time series data, extracts the maximum value and minimum value of the steering torque over a predetermined time, and calculates the difference between this maximum value and minimum value. The driving intention determination section then determines whether there is a decrease in the driving intention in accordance with this difference between the maximum value and minimum value. In this case, it is possible to quantitatively determine whether there is a decrease in the driving intention using statistical processing. Moreover, it is possible to determine simply and accurately whether there is a decrease in the driving intention.

Moreover, in the steering control apparatus for a vehicle of the present invention, the driving intention determination section may determine that there has been a decrease in the driving intention when a state in which the result of a calculation by the steering torque difference calculation section is less than or equal to a predetermined value continues for a predetermined time or longer.

According to the steering control apparatus for a vehicle having the above described structure, the driving intention determination section does not determine that there has been a decrease in the driving intention simply when the result of a calculation by the steering torque difference calculation section is equal to or less than a predetermined value, but makes this determination when this state has continued for a predetermined time or longer. As a result, it is possible to reliably determine whether there has been a decrease in the driving intention, and to perform even more appropriate steering control.

Moreover, in the steering control apparatus for a vehicle of the present invention, the driving intention determination section may determine that there has been a decrease in the driving intention when, in addition to the result of the calculation by the steering torque difference calculation section, a state in which the steering torque detected by the torque detector is less than or equal to a predetermined value continues for a predetermined time or longer.

According to the steering control apparatus for a vehicle having the above described structure, the driving intention determination section determines that there has been a decrease in the driving intention when, in addition to the result of the calculation by the steering torque difference calculation section, a state in which the steering torque detected by the torque detector is less than or equal to a predetermined value continues for a predetermined time or longer. As a result, it is possible to reliably determine whether there has been a decrease in the driving intention, and to perform even more appropriate steering control.

Furthermore, the third aspect of the present invention is a steering control apparatus for a vehicle, comprising: an actuator (for example, the motor 20 in the embodiment described below) that drives a steering mechanism (for example, the manual steering power generating mechanism 16 in the embodiment described below) capable of steering wheels (for example, the steering wheels 19 and 19 in the embodiment described below) of the vehicle; a torque detector (for example, the torque sensor 22 in the embodiment described below) that detects steering torque input by a driver; a travel route recognizing section (for example, the camera 25 and the image recognition processing section 26 in the embodiment described below) that recognizes a travel route of the vehicle; and a steering assistance section (for example, the EPS control apparatus 24 in the embodiment described below) that outputs a signal that drives the actuator such that the vehicle travels along the travel route recognized by the travel route recognizing section, wherein the steering control apparatus for a vehicle is provided with: a steering torque change state calculation section (for example, step S04 in the embodiment described below) that calculates one of a moving integral value of an amount of change in the steering torque detected by the torque detector and a moving integral value of a squared value of an amount of change in the steering torque detected by the torque detector; a steering torque difference calculation section (for example, step S45 in the embodiment described below) that calculates a difference between a maximum value and a minimum value of the steering torque detected by the torque detector in a predetermined period; a first driving intention determination section (for example, steps S05 to S10 in the embodiment described below) that determines whether there has been a decrease in the driving intention of the driver based on a result of a calculation by the steering torque change state calculation section; a second driving intention determination section (for example, steps S46 to S49 and steps S09 and S10 in the embodiment described below) that determines whether there has been a decrease in the driving intention of the driver based on a result of a calculation by the steering torque difference calculation section; a driving intention determination section (for example, a determination processing step in the embodiment described below) that determines whether there has been a decrease in the driving intention in accordance with at least the determination result by either of the first or second driving intention determination sections; a notification section (for example, the warning apparatus 34 in the embodiment described below) that outputs a warning to the driver; and an execution section (for example, the LKAS control apparatus 23 in the embodiment described below) that executes at least one of stopping the driving of the actuator by the steering assistance section and outputting the warning by the notification section when it is determined by the driving intention determination section that there has been a decrease in the driving intention.

According to the steering control apparatus for a vehicle having the above structure, for example, in a processing sequence that is executed at regular predetermined intervals, the steering torque change state calculation section calculates the absolute value of the difference between the previous value of the steering torque from the previous processing that was detected by the torque detector and the current value of the steering torque in the current processing that is detected by the torque detector, and stores each one as time series data. The first driving intention determination section determines whether there has been a decrease in the driving intention of the driver in accordance with a moving integral value that is obtained by adding absolute values of the above differences or squared values of the above differences that have been stored for a predetermined number of times in the past up until the current processing. Furthermore, for example, in a processing sequence that is executed at regular predetermined intervals, the steering torque difference calculation section sets the values of the steering torque detected by the torque detector as time series data, extracts the maximum value and minimum value of the steering torque over a predetermined time, and calculates the difference between this maximum value and minimum value. The second driving intention determination section then determines whether there is a decrease in the driving intention in accordance with this difference between the maximum value and minimum value. The execution section then executes at least one of stopping the driving of the actuator and outputting the warning based on at least the determination result by either of the first or second driving intention determination sections. Because of this, it is possible to improve the flexibility of the determination when determining the driving intention.

Moreover, in the steering control apparatus for a vehicle of the present invention the first driving intention determination section may determine that there has been a decrease in the driving intention when a state in which the result of a calculation by the steering torque change state calculation section is less than or equal to a first predetermined value continues for a first predetermined time or longer, and the second driving intention determination section determines that there has been a decrease in the driving intention when a state in which the result of a calculation by the steering torque difference calculation section is less than or equal to a second predetermined value continues for a second predetermined time or longer.

According to the steering control apparatus for a vehicle having the above described structure, it is not determined that there has been a decrease in the driving intention simply when the result of a calculation by the steering torque change state calculation section or by the steering torque difference calculation section is equal to or less than a predetermined value, but this determination is made when these states have continued for a predetermined time or longer. As a result, it is possible to reliably determine whether there has been a decrease in the driving intention, and to perform even more appropriate steering control.

Furthermore, the fourth aspect of the present invention is a steering control apparatus for a vehicle, comprising: an actuator (for example, the motor 20 in the embodiment described below) that drives a steering mechanism (for example, the manual steering power generating mechanism 16 in the embodiment described below) capable of steering wheels (for example, the steering wheels 19 and 19 in the embodiment described below) of the vehicle; a torque detector (for example, the torque sensor 22 in the embodiment described below) that detects steering torque input by a driver; a travel route recognizing section (for example, the camera 25 and the image recognition processing section 26 in the embodiment described below) that recognizes a travel route of the vehicle; and a steering assistance section (for example, the EPS control apparatus 24 in the embodiment described below) that outputs a signal that drives the actuator such that the vehicle travels along the travel route recognized by the travel route recognizing section, wherein the steering control apparatus for a vehicle is provided with: a standard deviation calculation section (for example, the standard deviation determining step in the embodiment described below) that calculates any of a standard deviation in the steering torques detected by the torque detector and a standard deviation in change amounts of the steering torque; a driving intention determination section (for example, the standard deviation determination step and steps S47 to S49 and steps S09 and S10 in the embodiment described below) that determines whether there has been a decrease in the driving intention of the driver based on a result of a calculation by the standard deviation calculation section; a notification section (for example, the warning apparatus 34 in the embodiment described below) that outputs a warning to the driver; and an execution section (for example, the LKAS control apparatus 23 in the embodiment described below) that executes at least one of stopping the driving of the actuator by the steering assistance section and outputting the warning by the notification section when it is determined by the driving intention determination section that there has been a decrease in the driving intention.

According to the steering control apparatus for a vehicle having the above structure, for example, in a processing sequence that is executed at regular predetermined intervals, the standard deviation calculation section sets steering torque values detected by the torque detector as time series data, and calculates one of the standard deviation or the standard deviation in the amounts of change in the steering torque. The driving intention determination section then determines whether there has been a decrease in the driving intention in accordance with one of the calculated standard deviation or standard deviation in the amounts of change in the steering torque. As a result, it is possible to determine simply and accurately whether there is a decrease in the driving intention.

Moreover, in the steering control apparatus for a vehicle of the present invention the driving intention determination section may determine that there has been a decrease in the driving intention when a state in which the result of the calculation by the standard deviation calculation section is less than or equal to a predetermined value continues for a predetermined time or longer.

According to the steering control apparatus for a vehicle having the above described structure, the driving intention determination section does not determine that there has been a decrease in the driving intention simply when the result of a calculation by the standard deviation calculation section is equal to or less than a predetermined value, but makes this determination when this state has continued for a predetermined time or longer. As a result, it is possible to reliably determine whether there has been a decrease in the driving intention, and to perform even more appropriate steering control.

Moreover, in the steering control apparatus for a vehicle of the present invention there may be provided a determination section (for example, the standard deviation determination step in the embodiment described below) for determining whether a size of the steering torque detected by the torque detector is less than or equal to a predetermined value, and the driving intention determination section may determine that there has been a decrease in the driving intention when the size of the steering torque in the result of the determination by the determination section is less than or equal to a predetermined value, and the result of the calculation by the standard deviation calculation section is less than or equal to a predetermined value.

According to the steering control apparatus for a vehicle having the above described structure, the driving intention determination section does not determine that there has been a decrease in the driving intention simply when the result of a calculation by the standard deviation calculation section is equal to or less than a predetermined value, but makes this determination when the size of the steering torque is equal to or less than a predetermined value. As a result, it is possible to reliably determine whether there has been a decrease in the driving intention, and to perform even more appropriate steering control.

Moreover, in the steering control apparatus for a vehicle of the present invention, the execution section may output the warning over a predetermined time from when it is determined by the driving intention determination section that there has been a decrease in the driving intention.

According to the steering control apparatus for a vehicle having the above described structure, if it is determined by the driving intention determination section that there has been a decrease in the driving intention, then it is possible to call the driver's attention to this by outputting a warning for a predetermined time from when the above determination is made using a notification section formed, for example, by a speaker that outputs a warning noise or a voice message or, for example, by a display that displays a warning or a lamp that flashes on or the like.

Moreover, in the steering control apparatus for a vehicle of the present invention, the execution section may stop the driving of the actuator motor after the output of the warning by the notification section.

According to the steering control apparatus for a vehicle having the above described structure, if it is determined by the driving intention determination section that there has been a decrease in the driving intention, firstly, the driver's attention is called by outputting a warning for a predetermined time using the notification section. Thereafter, if it is determined while this warning is being output that this decrease in the driving intention is still continuing, then it is determined that it is an inappropriate state for continuing the steering control, and the driving of the actuator is halted.

As a result, it is possible to reliably determine whether it is an appropriate state for continuing the steering control, and it is possible to prevent the driving of the actuator and the stopping of the driving of the actuator from being executed easily, thereby enabling suitable steering control to be performed.

Moreover, in the steering control apparatus for a vehicle of the present invention, after the driving of the actuator has been stopped, the driving of the actuator may be recommenced when it is determined by the driving intention determination section that there has been no decrease in the driving intention.

According to the steering control apparatus for a vehicle having the above described structure, after the driving of the actuator has been stopped, when, for example, a calculation result that exceeds a predetermined value is obtained in the steering torque change state calculation section, or the steering torque difference calculation section, or the standard deviation calculation section, it is determined by the driving intention determination section that there has been no decrease in the driving intention and the driving of the actuator is resumed. As a result, it is possible to perform appropriate steering control in accordance with the condition of the driver.

Moreover, in the steering control apparatus for a vehicle of the present invention, the driving intention determination section may determine whether there has been a decrease in the driving intention after a predetermined time has passed from when the driving of the actuator was stopped.

According to the steering control apparatus for a vehicle having the above described structure, it is not immediately determined by the driving intention determination section whether there has been a decrease in the driving intention, even when, for example, a calculation result that exceeds a predetermined value is obtained in the steering torque change state calculation section, or the steering torque difference calculation section, or the standard deviation calculation section after the driving of the actuator has been stopped. Instead, a determination as to whether there has been a decrease in the driving intention is made by the driving intention determination section, after a predetermined time has lapsed from when the driving of the actuator was stopped. As a result, particularly when the driving of the actuator is resumed, it is possible to reliably determine that there has been no decrease in the driving intention, and it is possible to prevent the driving of the actuator and the stopping of the driving of the actuator from being executed easily, thereby enabling suitable steering control to be performed.

Furthermore, in the steering control apparatus for a vehicle of the present invention, there may be provided with a deviation warning notification section (this role may also be performed, for example, by the LKAS control section 23 in the embodiment described below) that recognizes a position of the vehicle in the widthwise direction on the travel route based on a result of a recognition made by the travel route recognizing section, and when the position of the vehicle reaches a predetermined reference position (for example, the deviation warning commencement threshold value TH2 in the embodiment described below) that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

According to the steering control apparatus for a vehicle having the above described structure, when the position of the vehicle is further from a travel partitioning line on the travel route that is recognized by the travel route recognizing section than a predetermined reference position, the deviation warning notification section determines that a possibility exists that the vehicle has deviated from the travel route. At this time, the deviation determination section alters the reference position based on the result of a determination in the driving intention determination section, and by reflecting a decrease or otherwise in the driving intention in the setting of the reference position, it is possible to perform the appropriate deviation determination in accordance with the driving state of the driver.

DETAILED DESCRIPTION OF THE PREFERRED EMBODIMENTS

Figure 1:
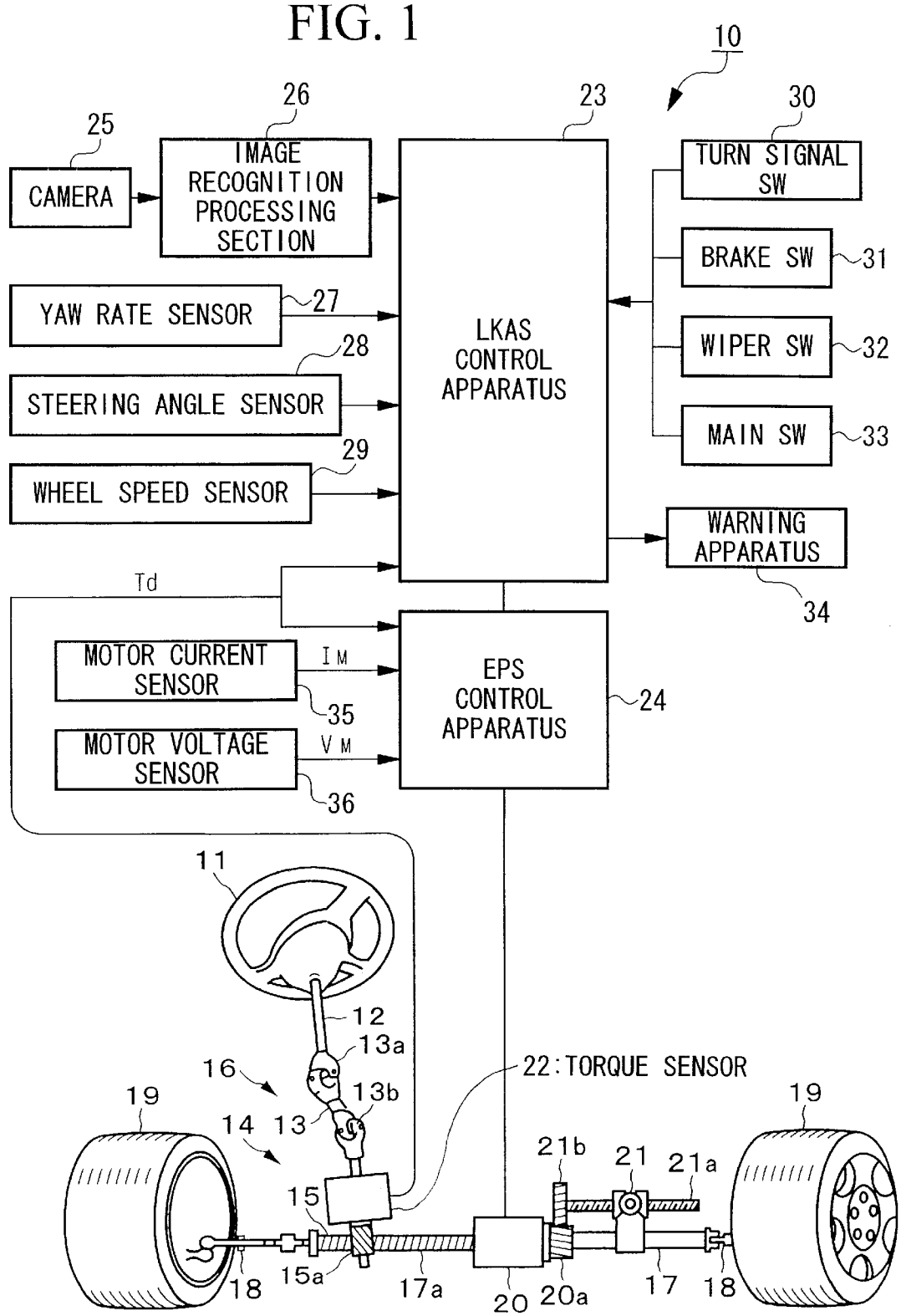
FIG. 1 is a structural view of the travel control apparatus for a vehicle according to an embodiment of the present invention.
Figure 2:
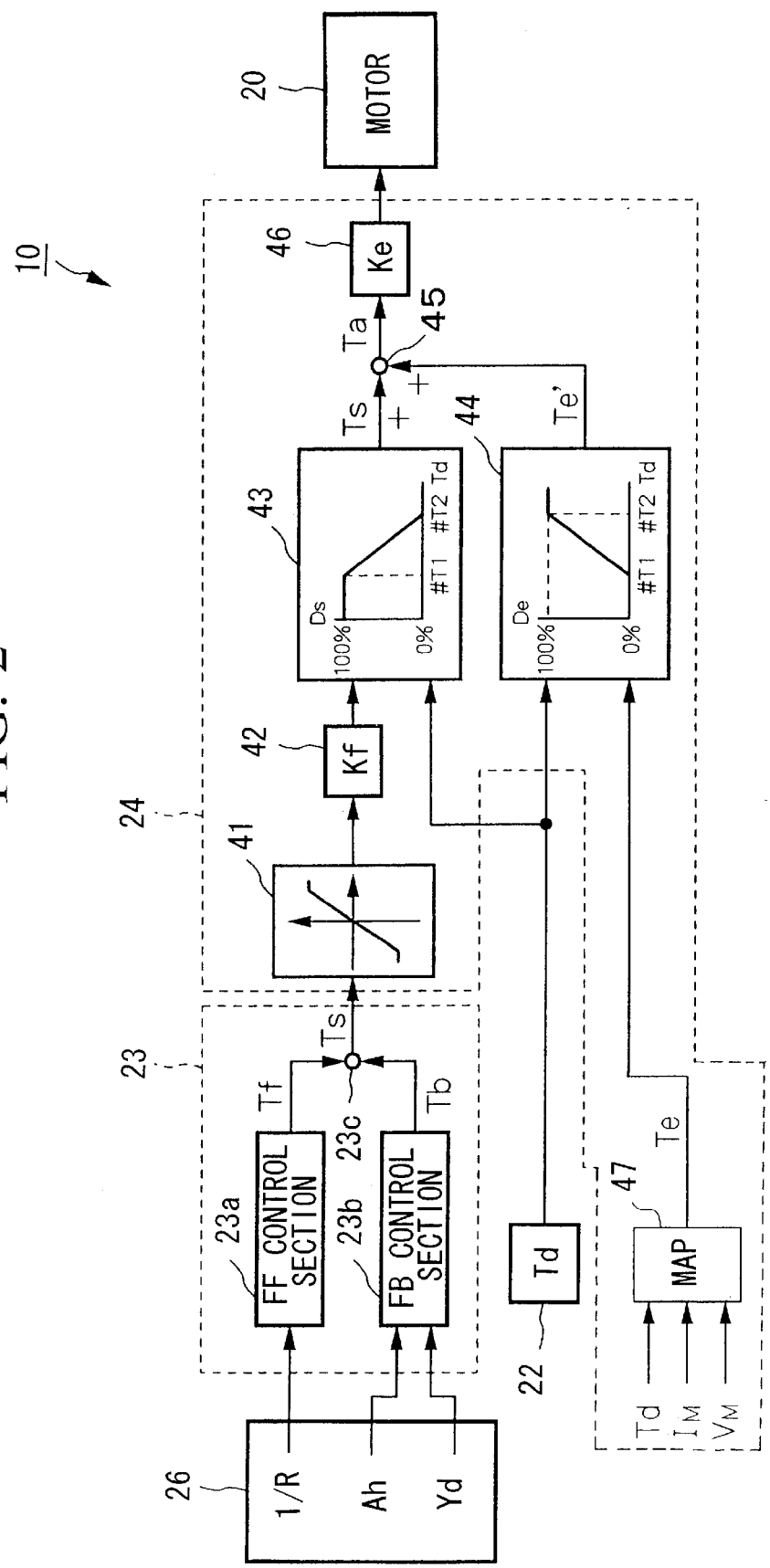
FIG. 2 is a functional block diagram showing the flow of steering assistance control processing according to the travel control apparatus for a vehicle shown in FIG. 1.
Figure 3:
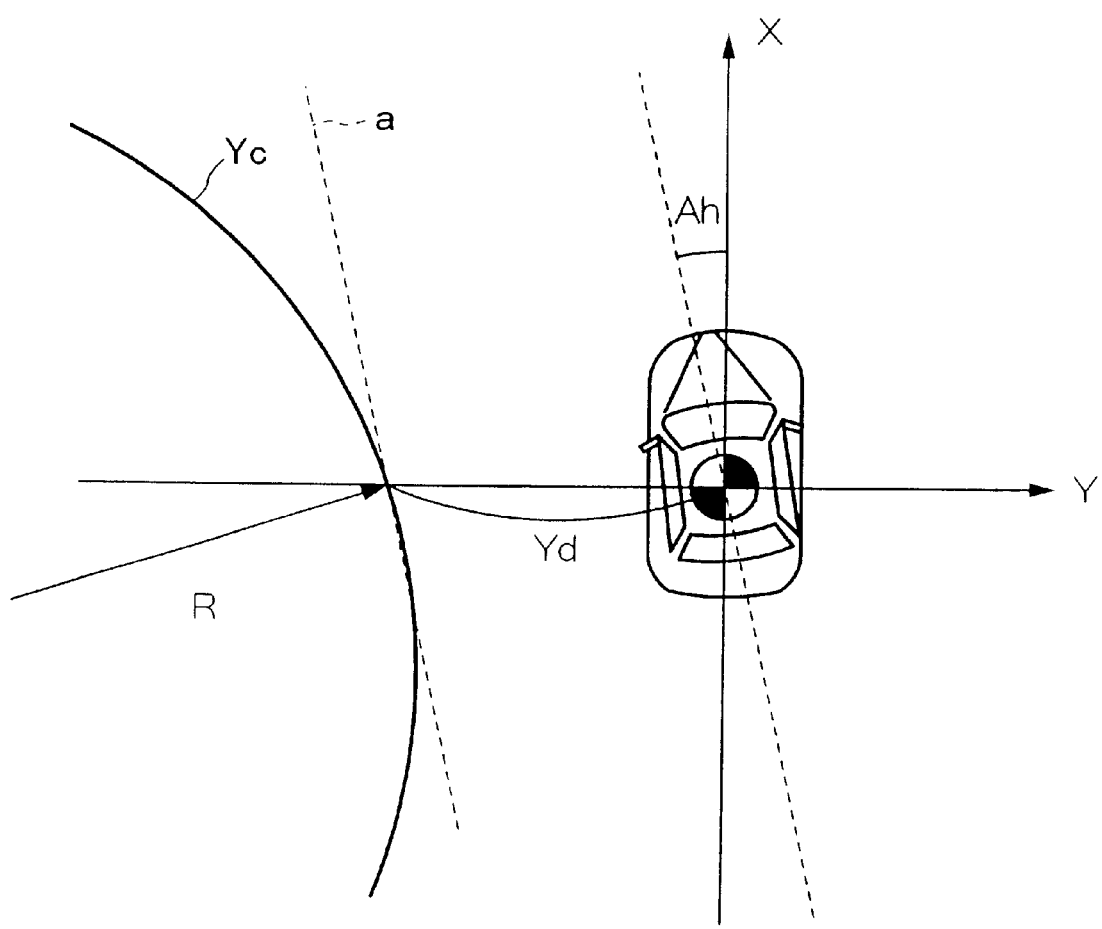
FIG. 3 is a view showing a deviation (lateral slippage amount) Yd in a vehicle position and a vehicle deviation angle Ah relative to a center line Yc of a travel route having a curvature 1/R.

The travel control apparatus for a vehicle according to an embodiment of the present invention will now be described with reference to the attached drawings. FIG. 1 is a structural view of the vehicle steering control apparatus 10 according to an embodiment of the present invention; FIG. 2 is a functional block diagram showing the flow of steering assistance control processing according to the vehicle steering control apparatus 10 shown in FIG. 1; and FIG. 3 is a view showing a deviation (lateral slippage amount) Yd in a vehicle position and a vehicle deviation angle Ah relative to a center line Yc of a travel route having a curvature 1/R.

As is shown in FIG. 1, in the vehicle steering control apparatus 10, a steering shaft 12 provided integrally with a steering wheel 11 is linked via a linking shaft 13 having universal joints 13a and 13b to a pinion 15a of a rack and pinion mechanism 15 provided inside a steering gear box 14, to thereby form a manual steering power generating mechanism 16.

The pinion 15a engages with rack teeth 17a of a rack shaft 17, and a rotation operation of the steering wheel 11 is converted into a reciprocal operation of the rack shaft 17 by the pinion 15a so as to cause two steering wheels 19 and 19 linked via tie rods 18 and 18 to both ends of the rack shaft 17 to steer the vehicle.

A motor 20 is provided coaxially with the rack shaft 17 and rotation force of the motor 20 is converted into thrust via a ball screw mechanism 21 provided substantially parallel to the rack shaft 17. Namely, a drive side helical gear 20a is provided integrally with a rotor (not shown) of the motor 20, and this drive side helical gear 20a engages with a helical gear 21b that is provided integrally with a shaft end of a threaded shaft 21a of the ball screw mechanism 21.

Inside the steering gear box 14 is provided a torque sensor 22 that detects the steering torque Td acting on the pinion 15a, namely, the steering torque Td generated by the manual operation of the driver. A detection signal for the steering torque Td detected by the torque sensor 22 is input into a lane keeping assistance system (LKAS) control apparatus 23 and an electric power steering (EPS) control apparatus 24.

In LKAS control mode, the LKAS control apparatus 23 calculates the assistance amount for the torque needed to make the vehicle travel along travel partitioning lines on the road in the direction in which the vehicle is traveling. In addition, under predetermined conditions, steering assistance torque Ts is output to the EPS control apparatus 24 as a torque command to output this assistance amount to the motor 20.

As a result, in addition to the detection signal of the steering torque Td output from the torque sensor 22, various signals are input into the LKAS control apparatus 23. These include information on the travel partitioning lines output from an image recognition processing section 26 (described below), detection signals output from a yaw rate sensor 27 that detects the yaw rate (angular speed of rotation) around the vertical (gravitational) axis of the center of gravity of the vehicle, detection signals output from a steering angle sensor 28 that is formed by a rotary encoder or the like provided, for example, on the steering shaft 12 and that detects the direction and size of the steering angle input by the driver, and detection signals output from a wheel speed sensor 29 that detects the rotational speed of a wheel.

Furthermore, various signals are input into the LKAS control apparatus 23. These include signals giving notification of the ON/OFF state of turn signals output from a turn signal switch (SW) 30, signals giving notification of the ON/OFF state of brakes output from a brake SW 31, signals giving notification of the ON/OFF state of wipers output from a wiper SW 32, and signals giving notification of the ON/OFF state, for example, of the LKAS control apparatus 23 output from a main SW 33.

Namely, in cases such as when a signal notifying that a turn signal is ON is input from the turn signal SW 30, or when a signal notifying that the brake is ON is input from the brake SW 31, or when a signal notifying that the wipers are ON is input from the wiper SW 32, or when a signal notifying that the LKAS control apparatus 23 is OFF is input from the main SW 33, or when processing to extract travel partitioning lines by the LKAS control apparatus 23 is difficult, the LKAS control apparatus 23 is set such that an output of steering assistance torque Ts to the EPS control apparatus 24 is halted.

In addition, a warning apparatus 34 formed, for example, by a speaker that outputs a warning noise or a voice message or, for example, by a display that displays a warning or a lamp that flashes on or the like is connected to the LKAS control apparatus 23, and is set such that a warning is output if, for example, the vehicle departs from within a predetermined traveling area.

The EPS control apparatus 24 outputs a motor drive current that outputs to the motor 20 an assistance amount for the steering torque Td that corresponds to the travel state of the vehicle.

Accordingly, in addition to the detection signals of the steering assistance torque Ts output from the LKAS control apparatus 23 and of the steering torque Td output from the torque sensor 22, a detection signal (motor current) $I_M$ output from a motor current sensor 35 that detects an energizing current of the motor 20, and a detection signal (motor voltage) $V_M$ output from a motor voltage sensor 36 that detects an energizing voltage of the motor 20 are input into the EPS control apparatus 24.

In EPS control mode, in accordance, for example, with the steering torque Td input by the driver that is detected by the torque sensor 22, the EPS control apparatus 24 calculates an assistance amount for the power steering to assist the steering torque Td, and calculates a power steering torque Te as a torque command to cause the above assistance amount to be output from the motor 20. In addition, as is described below, the EPS control apparatus 24 sets a predetermined control ratio De (for example, a predetermined value of 100% or less) for this EPS control mode in accordance with the steering torque Td, and sets a value obtained by calculating the control ratio De against the power steering torque Te as a new power steering torque Te'.

Moreover, as is described below, the EPS control apparatus 24 sets a predetermined control ratio Ds (for example, a predetermined value of 100% or less) for the LKAS control mode in accordance with, for example, the steering torque Td detected by the torque sensor 22, and sets a value obtained by calculating this control ratio Ds against the steering assistance torque Ts input from the LKAS control apparatus 23 as a new steering assistance torque Ts.

In addition, the EPS control apparatus 24 adds the new power steering torque Te' for the EPS control mode to the steering assistance torque Ts for the LKAS control mode, calculates an assistance torque Ta, and outputs via a drive circuit (not shown) of the motor 20 a motor drive current for generating the assistance torque Ta.

The processing of the vehicle steering control apparatus 10 according to the present embodiment, in particular, the operations of the LKAS control apparatus 23 and the EPS control apparatus 24 will now be described with reference to FIGS. 2 and 3.

Firstly, images of travel partitioning lines in predetermined areas to the front and rear of a vehicle are photographed by a camera 25 provided, for example, integrally with an rear view mirror (not shown) or the like on the inside of the front windshield of the vehicle. Travel partitioning lines (white lines) are then recognized by the image recognition processing section 26 based on image data output from the camera 25.

At this time, as is shown in FIG. 3, for example, the image recognition processing section 26 calculates the curvature 1/R of the travel route from the turning radius R of the center line Yc of the travel route at an appropriate position on the travel route. Moreover, the image recognition processing section 26 sets a relative coordinates system in which, for example, the current position of the vehicle is taken as the origin, the direction of movement of the vehicle is taken as the X axis, and a direction orthogonal to the X axis (i.e., the widthwise direction of the vehicle) is taken as the Y axis. The image recognition processing section 26 then calculates a deviation (lateral slippage amount) Yd, which is a distance from the current position of the vehicle on the Y axis to the center line Yc of the travel route, and also calculates an angle (vehicle deviation angle) Ah formed by the X axis and a tangent "a" of the center line Yc at the intersection position of the center line Yc of the travel route with the Y axis.

The image recognition processing section 26 then outputs the calculated curvature 1/R of the travel route to an FF control section 23a of the LKAS control apparatus 23, and outputs the lateral slippage amount Yd and vehicle deviation angle Ah to an FB control section 23b of the LKAS control apparatus 23.

The FF control section 23a of the LKAS control apparatus 23 calculates a base steering assistance torque Tf based on predetermined characteristics from the curvature 1/R of the travel route using feed forward control, and outputs this to an addition section 23c.

The FB control section 23b of the LKAS control apparatus 23 calculates a correction steering assistance torque Tb based on the lateral slippage amount Yd and vehicle deviation angle Ah using feedback control, and outputs this to an addition section 23c.

The base steering assistance torque Tf is an assistance torque for keeping balance with the cornering force of the vehicle, while the correction steering assistance torque Tb is an assistance torque for making the vehicle travel along the center line Ye of the travel route, or to keep the stability of the vehicle.

The addition section 23c adds the base steering assistance torque Tf to the correction steering assistance torque Tb to calculate a steering assistance torque Ts needed to make the vehicle travel along the travel partitioning lines. This is then output to a limit value setting section 41 of the EPS control apparatus 24.

The limit value setting section 41 of the EPS control apparatus 24 sets a limit value for the motor drive current supplied to the motor 20 or for the steering assistance torque Ts.

A first control gain calculation section 42 outputs to an LKAS control ratio calculation section 43 as a new steering assistance torque Ts a value obtained by a mathematical operation using a predetermined first gain Kf and the steering assistance torque Ts.

The LKAS control ratio calculation section 43 calculates a predetermined control ratio Ds for LKAS control mode based on the steering torque Td detected by the torque sensor 22, and outputs to the addition section 45 as a new steering assistance torque Ts a value obtained by a mathematical operation using this control ratio Ds and the steering assistance torque Ts.

For example, when the steering torque Td is equal to or less than a predetermined first torque #T1, the control ratio Ds is taken as 100%; when the steering torque Td is equal to or more than the predetermined first torque #T1 and is also equal to or less than a predetermined second torque #T2, the control ratio Ds decreases; and when the steering torque Td is equal to or more than the predetermined second torque #T2, the control ratio Ds is taken as 0%.

An EPS control ratio calculation section 44 calculates a predetermined control ratio De for EPS control mode based on the steering torque Td detected by the torque sensor 22, and outputs to the addition section 45 as a new power steering torque Te' a value obtained by a mathematical operation using this control ratio De and a power steering torque Te that was determined using a map 47 that was determined in advance from the steering torque Td, the motor current $I_M$, and the motor voltage $V_M$.

For example, when the steering torque Td is equal to or less than a predetermined first torque #T1, the control ratio De is taken as 0%; when the steering torque Td is equal to or more than the predetermined first torque #T1 and is also equal to or less than a predetermined second torque #T2, the control ratio De increases; and when the steering torque Td is equal to or more than the predetermined second torque #T2, the control ratio De is taken as 100%.

The addition section 45 adds the power steering torque Te' to the steering assistance torque Ts to calculate an assistance torque Ta that is the target value for the torque generated in the motor 20.

The second control gain calculation section 46 performs a mathematical operation using a predetermined second control gain Ke and the assistance torque Ta to calculate an energizing current value for the motor 20 to generate the assistance torque Ta, and, based on this energizing current value, outputs a motor drive current to the motor 20.

Note that in the present embodiment the LKAS control apparatus 23 calculates the assistance steering torque Ts and outputs it to the EPS control apparatus 24, however, it is also possible to employ a structure in which the steering assistance torque Ts is converted into motor drive current in the LKAS control apparatus 23 and this is then output to the EPS control apparatus 24.

The vehicle steering control apparatus 10 of the present embodiment has the above described structure. Next, the operation of this vehicle steering control apparatus 10 will be described with reference to the attached drawings.

Figure 4:
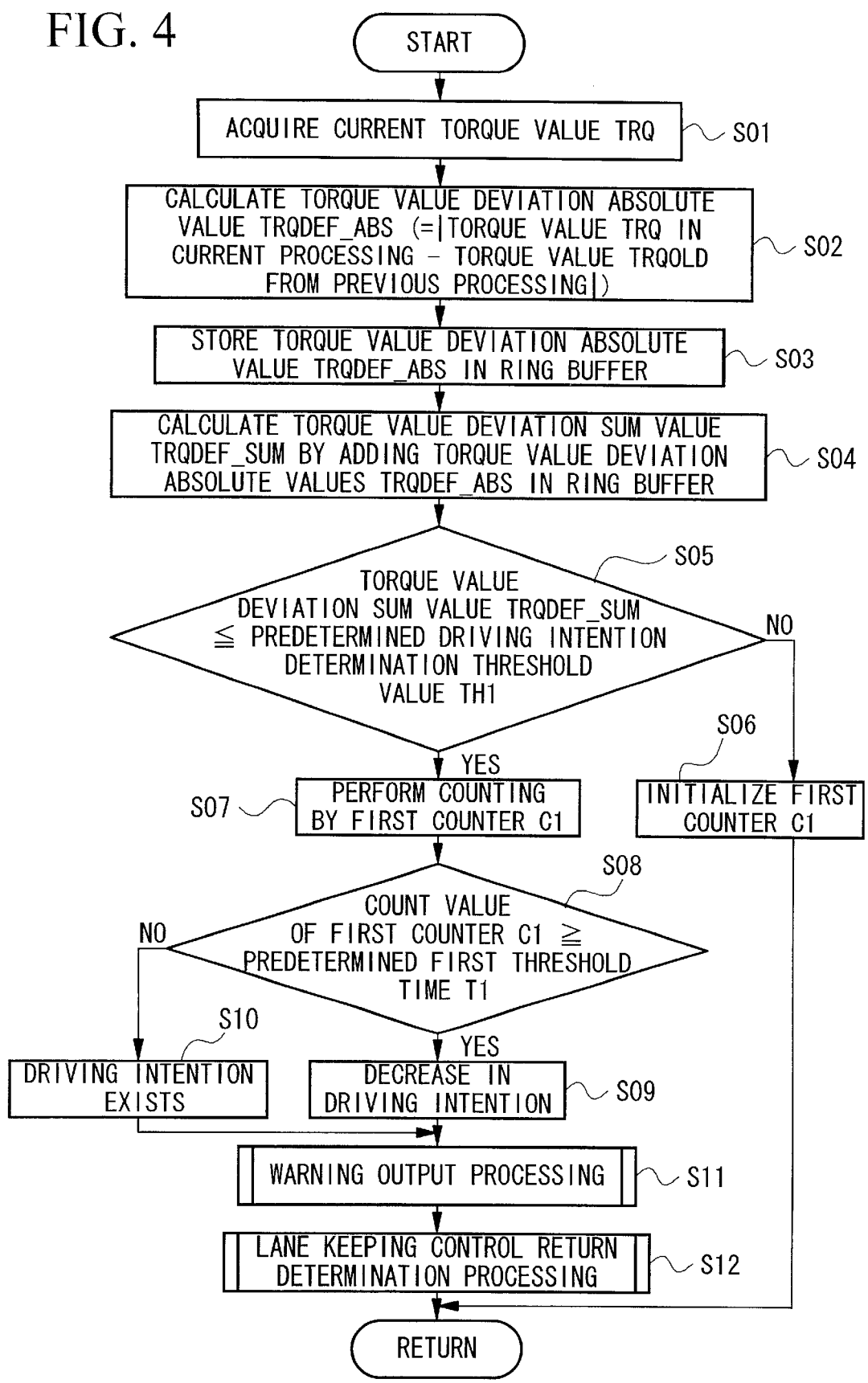
FIG. 4 is a flow chart showing the operation of the steering control apparatus for a vehicle shown in FIG. 1.
Figure 5:
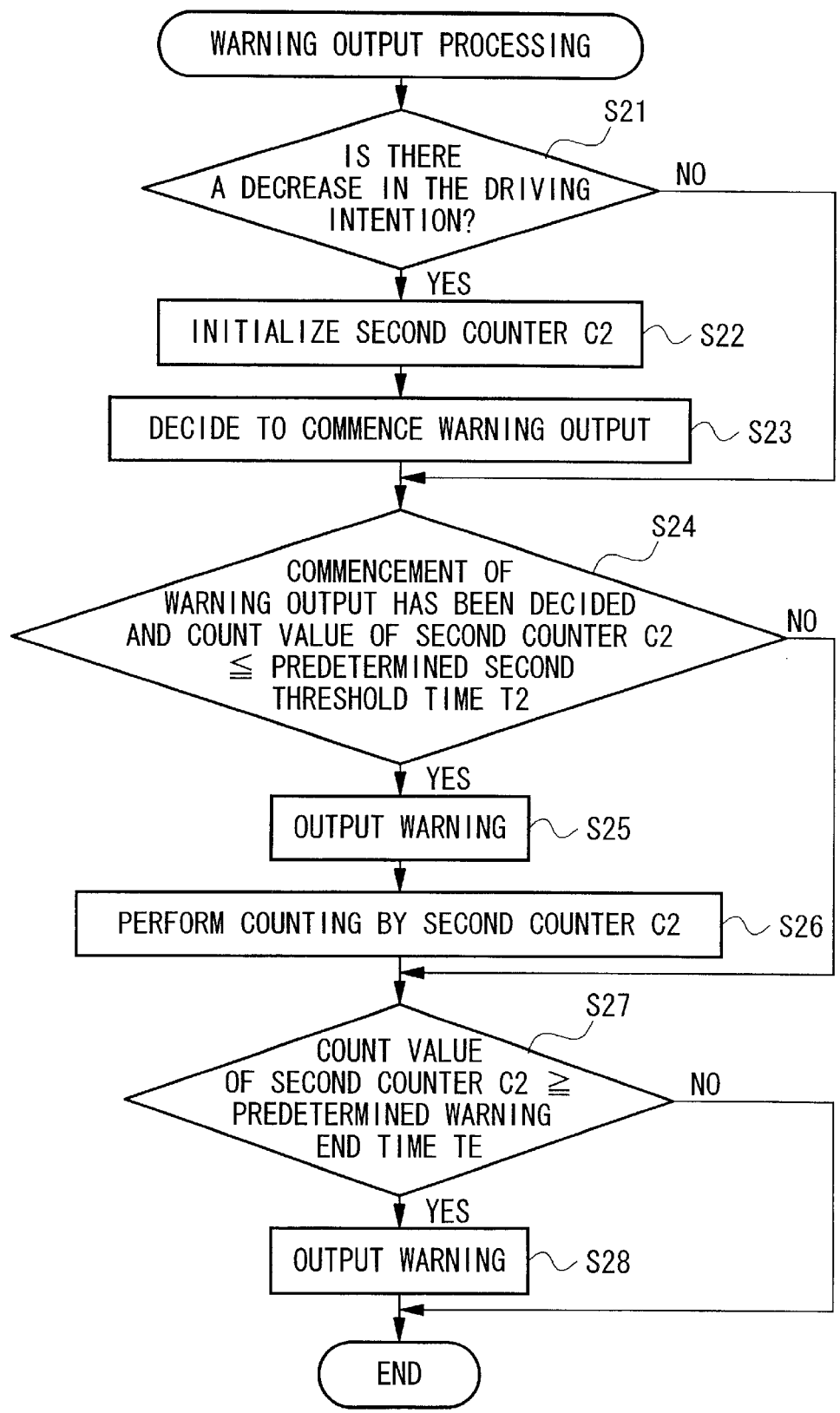
FIG. 5 is a flow chart showing the warning output processing shown in FIG. 4.
Figure 6:
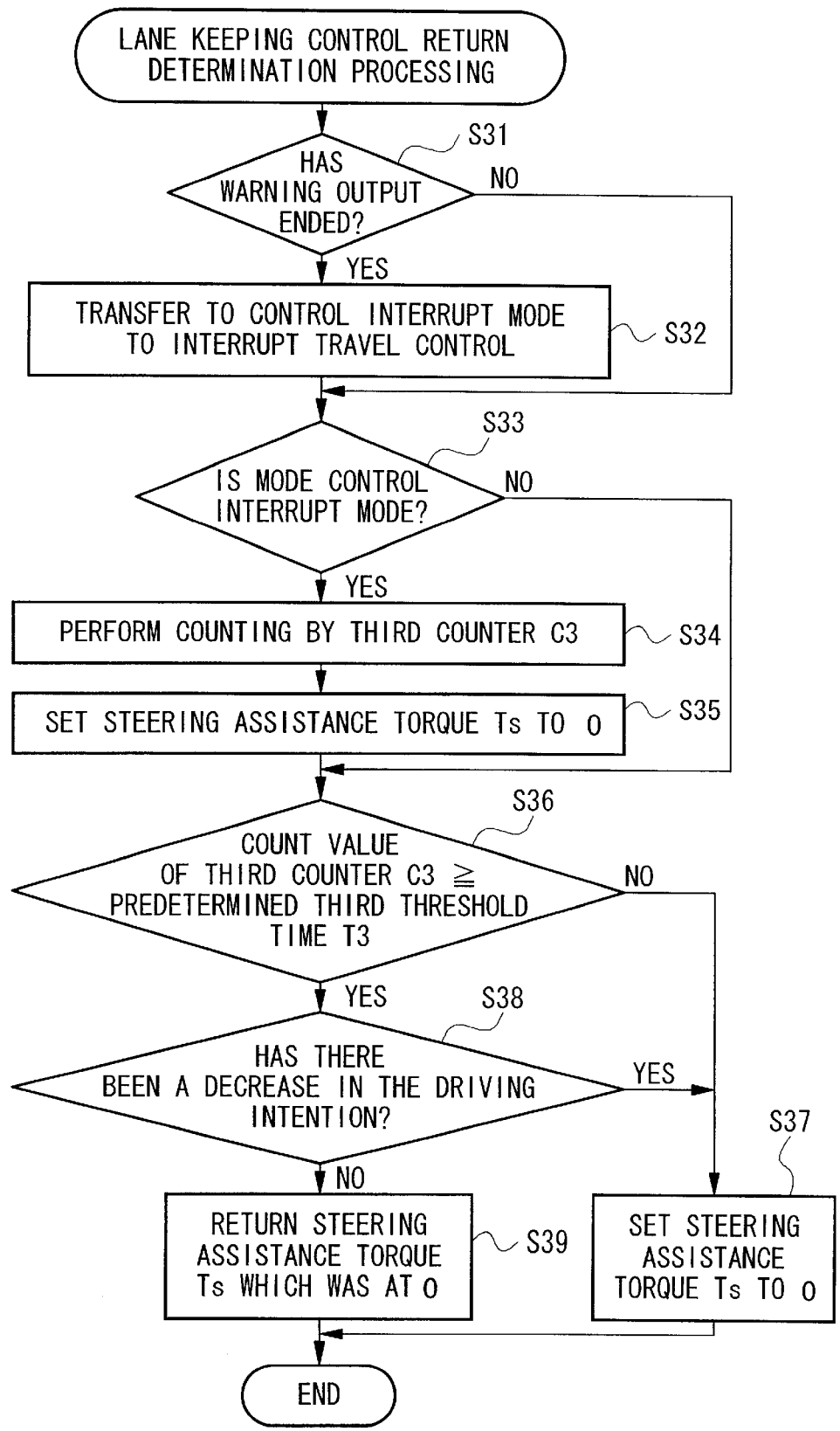
FIG. 6 is a flow chart showing the lane keeping control return determination processing shown in FIG. 4.
Figure 7:
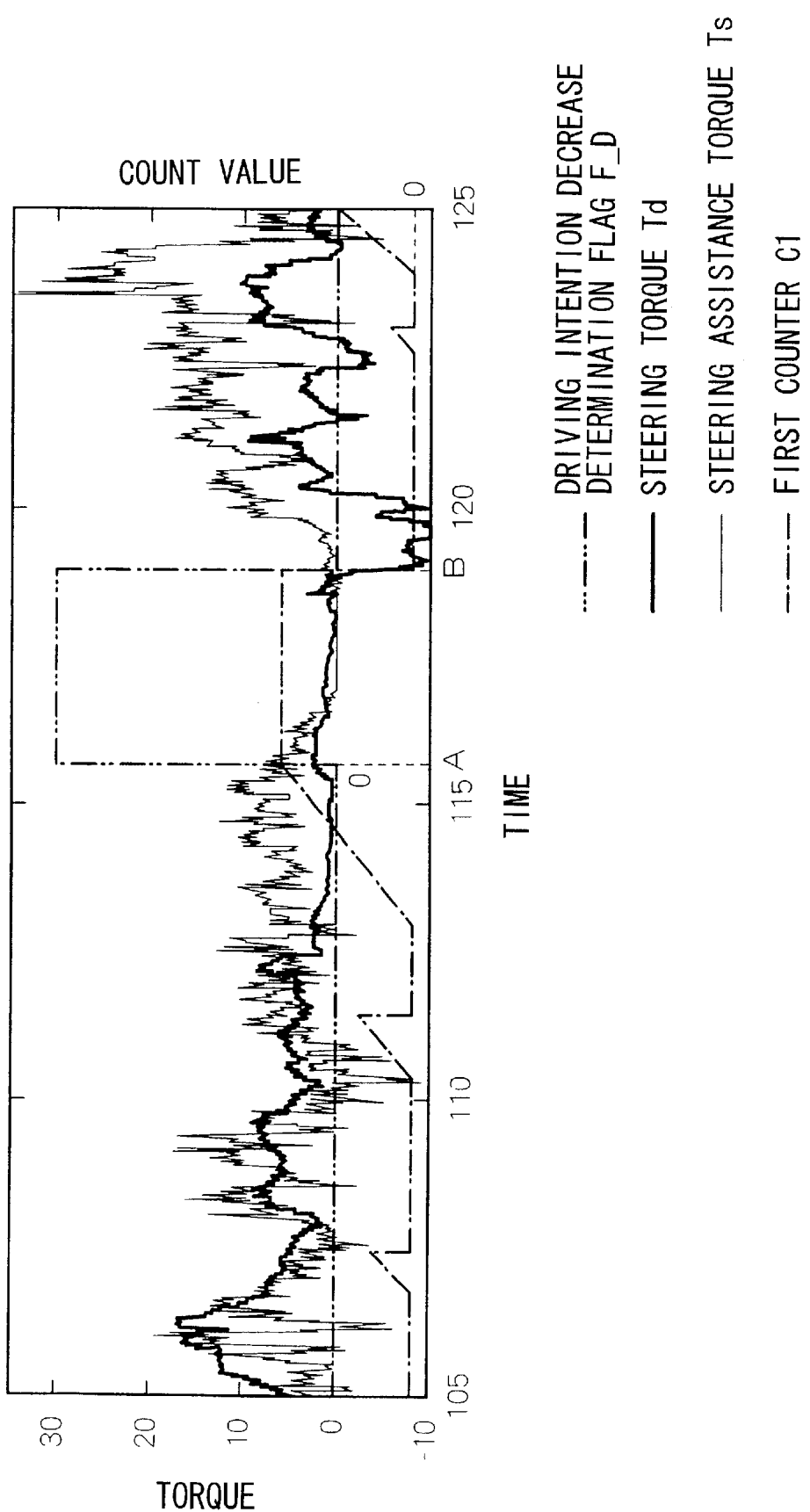
FIG. 7 is a graph showing an example of temporal changes in a flag value of a decreased driving intention determination flag F_D, steering torque Td, steering assistance torque Ts, and count values of a first counter C1.

FIG. 4 is a flow chart showing the operation of the vehicle steering control apparatus 10; FIG. 5 is a flow chart showing the warning output processing shown in FIG. 4; FIG. 6 is a flow chart showing the lane keeping control return determination processing shown in FIG. 4; and FIG. 7 is a graph showing an example of temporal changes in a flag value of a decreased driving intention determination flag F_D, steering torque Td, steering assistance torque Ts, and count values of a first counter C1.

Note that the processing sequence shown below is repeated at predetermined interval (for example, every 100 ms).

Firstly, in step S01 shown in FIG. 4 the current torque value TRQ is acquired using detection signals output from the torque sensor 22.

Next, in step S02 a torque value deviation absolute value TRQDEF_ABS (=|TRQ−TRQOLD|) is calculated using the absolute value of the difference between the torque value TRQOLD from the previous processing and the torque value TRQ from the current processing.

Next, in step S03 the calculated torque value deviation absolute value TRQDEF_ABS is stored in a storage section formed by a ring buffer (not shown).

Next, in step S04 all of the torque value deviation absolute values TRQDEF_ABS stored in the storage section are added to give a torque value deviation sum value TRQDEF_SUM.

Here, the storage section in which the torque value deviation absolute values TRQDEF_ABS are stored may be, for example, a ring buffer having a predetermined number of buffers that are able to be set appropriately. If the ring buffer has, for example, 30 buffers, then in a processing sequence that is repeated at predetermined interval (for example, every 100 ms), data of 30 torque value deviation absolute values TRQDEF_ABS for the previous three seconds are stored. In this way, the storage section is set such that each time new data is added the oldest data is deleted, resulting in 30 items of data for the most recent three seconds always being stored.

Next, in step S05 it is determined whether the torque value deviation sum value TRQDEF_SUM is equal to or less than a predetermined driving intention determination threshold value TH1 (for example, 8 kgf cm×9.8/100 N m).

If the result of this determination is "NO" the flow proceeds to step S06 in which the count value of a first counter C1 is initialized by setting 0 for the count value, and the processing sequence is ended.

If, however, the result of the determination is "YES" the flow proceeds to step S07 in which counting by the first counter C1 is executed.

Next, in step S08 it is determined whether the count value of the first counter C1 is equal to or more than a predetermined first threshold time T1 (several seconds, for example, 5 seconds).

If the result of this determination is "YES" the flow proceeds to step S09 in which "1" is set for the flag value of the decreased driving intention determination flag F_D that shows whether there has been a decrease in the driving intention of the driver, and it is determined that there has been a decrease in the driving intention. The flow then proceeds to step S11 described below.

If, however, the result of the determination in step S08 is "NO" the flow proceeds to step S10 in which "0" is set for the flag value of the decreased driving intention determination flag F_D that shows whether there has been a decrease in the driving intention of the driver, and it is determined that the driver is driving intentionally. The flow then proceeds to step S11.

In step S11 warning output processing (described below) is executed.

Next, in step S12 the lane keeping control return determination processing (described below) is executed and the processing sequence is ended.

The aforementioned warning output processing of step S11 will now be described with reference to the attached drawings.

Firstly, in step S21 shown in FIG. 5 it is determined whether the flag value of the decreased driving intention determination flag F_D is "1", namely, it is determined whether it has been determined that there has been a decrease in the driving intention of the driver.

If the result of this determination is "NO" the flow proceeds to step S24 (described below).

If, however, the result of this determination is "YES" the flow proceeds to step S22.

In step S22, "0" is set for the count value of a second counter C2 that relates to warning time thereby initializing the count value.

Next, in step S23 it is decided to commence output of a warning.

Next, in step S24 it is determined whether commencement of a warning output has been decided and also whether the count value of the second counter C2 is equal to or more than a predetermined second threshold time T2 (for example, T2=3 seconds).

If the result of this determination is "NO" the flow proceeds to step S27 (described below).

If, however, the result of this determination is "YES" the flow proceeds to step S25.

In step S25 a warning is output.

Next, in step S26 counting by the second counter C2 is performed.

In step S27 it is determined whether the count value of the second counter C2 has reached a predetermined warning end time TE (for example, TE=3 seconds).

If the result of this determination is "YES" the flow proceeds to step S28 in which the output of the warning is ended, thereby ending the processing sequence.

If, however, the result of the determination is "NO" the processing sequence is ended.

The lane keeping control return determination processing of the aforementioned step S12 will now be described with reference to the attached drawings.

Firstly, in step S31 shown in FIG. 6 it is determined whether the output of the warning has ended.

If the result of this determination is "NO" the flow proceeds to step S33 (described below).

If, however, the result of this determination is "YES" the flow proceeds to step S32.

In step S32 it is decided to move to control interrupt mode in which travel control by the steering control apparatus 10 is interrupted.

Next, in step S33 whether the apparatus is in control interrupt mode is determined.

If the result of this determination is "NO" the flow proceeds to step S36 (described below).

If, however, the result of this determination is "YES" the flow proceeds to step S34.

In step S34 counting by a third counter C3 is performed.

Next, in step S35 the steering assistance torque Ts is set to zero by changing the value of the first control gain Kf.

Next, in step S36 it is determined whether the third counter C3 has reached a predetermined third threshold time T3 (for example, T3=3 seconds).

If the result of this determination is "NO" the flow proceeds to step S37 in which the steering assistance torque Ts is set to zero by changing the value of the first control gain Kf, and the processing sequence is ended.

If, however, the result of the determination is "NO" the flow proceeds to step S38.

In step S38 it is determined whether the flag value of the decreased driving intention determination flag F_D is "1", namely, it is determined whether it has been determined that there has been a decrease in the driving intention of the driver.

If the result of this determination is "YES" the flow proceeds to the aforementioned step S37.

If, however, the result of this determination is "NO" the flow proceeds to step S39.

In step S39 the steering assistance torque Ts that had been set to "0" is returned to a predetermined set value by changing the value of the first control gain Kf, thereby ending the processing sequence.

In steps S35, S37, and S39 when the steering assistance torque Ts is set to "0" or when it is returned to the predetermined set value, it is also possible to make the change last for a predetermined time (for example, 1 or 2 seconds).

Namely, as is shown, for example, in FIG. 7 when the temporal change in the steering torque Td input by the driver becomes smaller, and, as described above, the torque value deviation sum value TRQDEF_SUM becomes equal to or less than the predetermined driving intention determination threshold value TH1, counting by the first counter C1 is started in order to determine whether the driver is driving intentionally.

Next, when the count value of the first counter C1 becomes equal to or more than the predetermined first threshold value T1 (for example, at the time A in FIG. 7), the flag value of the decreased driving intention determination flag F_D is set to "1", and in addition to it being determined that there has been a decrease in the driving intention of the driver, the steering assistance torque Ts is gradually decreased to zero.

Next, when the temporal change in the steering torque Td input by the driver increases, and the torque value deviation sum value TRQDEF_SUM exceeds the predetermined driving intention determination threshold value TH1 (for example, at the time B in FIG. 7), the flag value of the decreased driving intention determination flag F_D is set to "0", and in addition to it being determined that the driver is driving intentionally, the steering assistance torque Ts is gradually returned from zero to a predetermined set value.

Here, when the apparatus moves to control interrupt mode, in which travel control is interrupted by outputting a warning over a predetermined warning end time TE, the duration of this control interrupt mode is counted by the third counter C3, and each time the count value reaches a predetermined third threshold time T3, it is determined whether the flag value of the decreased driving intention determination flag F_D is "1", namely, it is determined whether it has been determined that there has been a decrease in the driving intention of the driver.

When there has been a decrease in the driving intention of the driver, the control interrupt mode is continued; when it is determined that there has not been a decrease in the driving intention of the driver, the control interrupt mode is halted and the apparatus returns to a predetermined travel control.

As has been described above, according to the vehicle steering control apparatus 10 of the present embodiment, by determining whether there has been a decrease in the driving intention of the driver in accordance with a moving integral value (torque value deviation sum value TRQDEF_SUM) of a torque value deviation absolute value TRQDEF_ABS (=|TRQ−TRQOLD|), which is the absolute value of the difference between the torque value TRQOLD of the previous processing and the torque value TRQ of the current processing, it is possible to simply and accurately determine whether there has been a decrease in the driving intention of the driver.

Moreover, by not simply determining that there has been a decrease in the driving intention when the torque value deviation sum value TRQDEF_SUM has become equal to or less than a predetermined driving intention determination threshold value TH1, but by making this determination when this state continues for a predetermined first threshold time T1, it is possible to reliably determine whether there has been a decrease in the driving intention of the driver and to perform even better steering control.

Note that in the present embodiment the torque value deviation absolute value TRQDEF_ABS (=|TRQ−TRQOLD|) is calculated using the absolute value of the difference between torque value TRQOLD of the previous processing and the torque value TRQ of the current processing, and this torque value deviation absolute value TRQDEF_ABS is then stored, however, the present embodiment is not limited to this and it is also possible, for example, to calculate the squared value of the torque value deviation absolute value TRQDEF_ABS (=|TRQ−TRQOLD|), and to store this squared value of the torque value deviation absolute value TRQDEF_ABS (=|TRQ−TRQOLD|).

In this case, the torque value deviation squared value sum value SQR_SUM is calculated by adding the squared values of all of the torque value deviation absolute values TRQDEF_ABS stored in the storage section. It is then determined whether the torque value deviation squared value sum value SQR_SUM is equal to or less than the predetermined driving intention determination threshold value THQ1.

Note also that in the present embodiment the torque value deviation sum value TRQDEF_SUM, namely, the moving integral value of the torque value deviation absolute value TRQDEF_ABS is calculated by storing the torque value deviation absolute values TRQDEF_ABS in a ring buffer and adding all of the torque value deviation absolute values TRQDEF_ABS stored in this ring buffer, however, the present embodiment is not limited to this and it is also possible for the moving integral value to be calculated using, for example, a digital filter for the transfer function H (z) shown in Equation (1) below.

$$H(z) = \frac{B(z)}{A(z)} = \frac{\sum_{j=0}^{nb} b(j+1) \cdot z^{-j}}{1 + \sum_{j=1}^{na} a(j+1) \cdot z^{-j}} \qquad (1)$$

$$= \frac{b(1) + b(2) \cdot z^{-1} + \ldots b(nb+1) \cdot z^{-nb}}{1 + a(2) \cdot z^{-1} + \ldots + a(na+1) \cdot z^{-na}}$$

In Equation (1), for example, when a (j)=0, b(j)=1, and nb=29, by supplying a torque value deviation absolute value TRQDEF_ABS for the input at predetermined interval (for example, every 100 ms), it is possible to calculate the moving integral value of the torque value deviation absolute value TRQDEF_ABS for the most recent three seconds and, as a result of this, it is possible to do away with the ring buffer and the like and simplify the apparatus structure.

Figure 8:
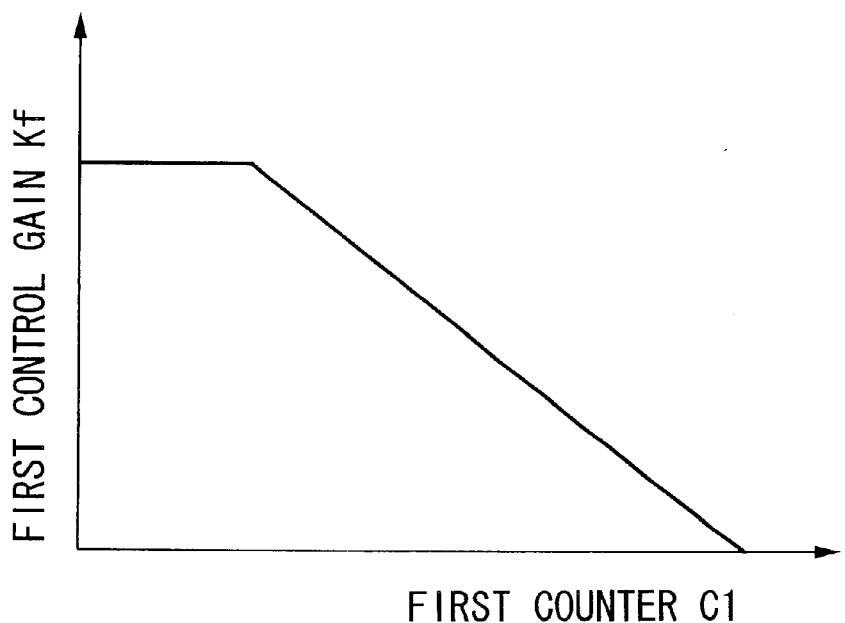
FIG. 8 is a graph showing changes in a first control gain Kf corresponding to the count values of a first counter C1.

Note also that in the present embodiment, for example, as is shown in the graph showing changes in the first control gain Kf corresponding to the count value of the first counter C1 shown in FIG. 8, in accordance with the count value of the first counter C1 showing what might be termed the strength of the driving intention of the driver, it is also possible to reduce the value of the driving support ratio provided by the first control gain Kf, namely, by travel control when the count value increases. In this case, it is possible to perform the appropriate travel control in accordance with the driving intention of the driver, and if the driving intention begins to decrease, the steering assistance torque Ts is made smaller by reducing the first control gain Kf. As a result, a change has occurred in the reaction force from the steering wheel 11 felt by the driver, and it is possible for the driver himself or herself to recognize that there has been a decrease in the driving intention.

Figure 9:
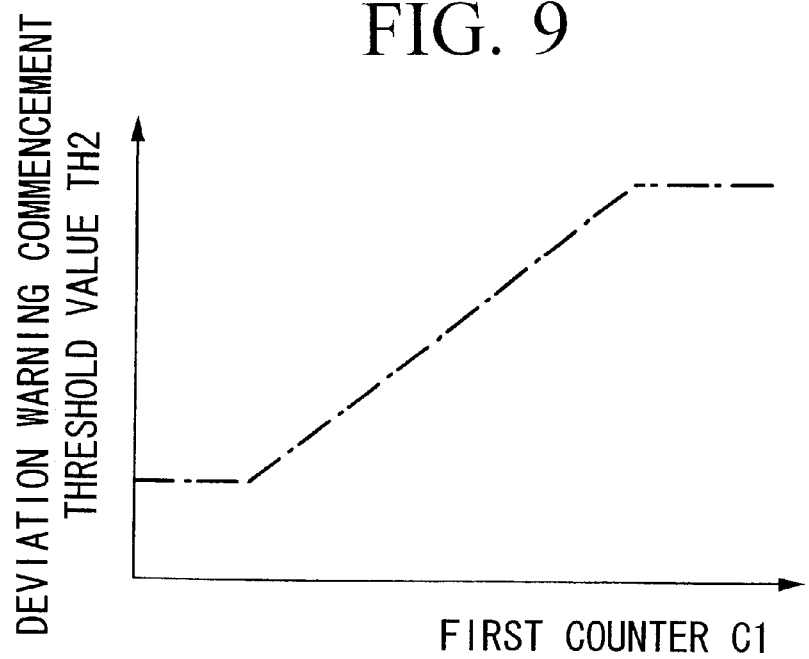
FIG. 9 is a graph showing changes in a deviation warning commencement threshold value TH2 corresponding to the count values of a first counter C1.

Further, in the present embodiment, for example, as is shown in the graph showing changes in a deviation warning commencement threshold value TH2 corresponding to the count value of the first counter C1 shown in FIG. 9, it is also possible to make the settings such that it can be determined when the count value of the first counter C1 increases that there has been a decrease in the driving intention of the driver, and the deviation warning commencement threshold value TH2, which is used to determine whether notification is to be given that the vehicle has deviated from a predetermined travel area, can be lowered, thereby enabling a warning to be output more frequently.

Figure 10:
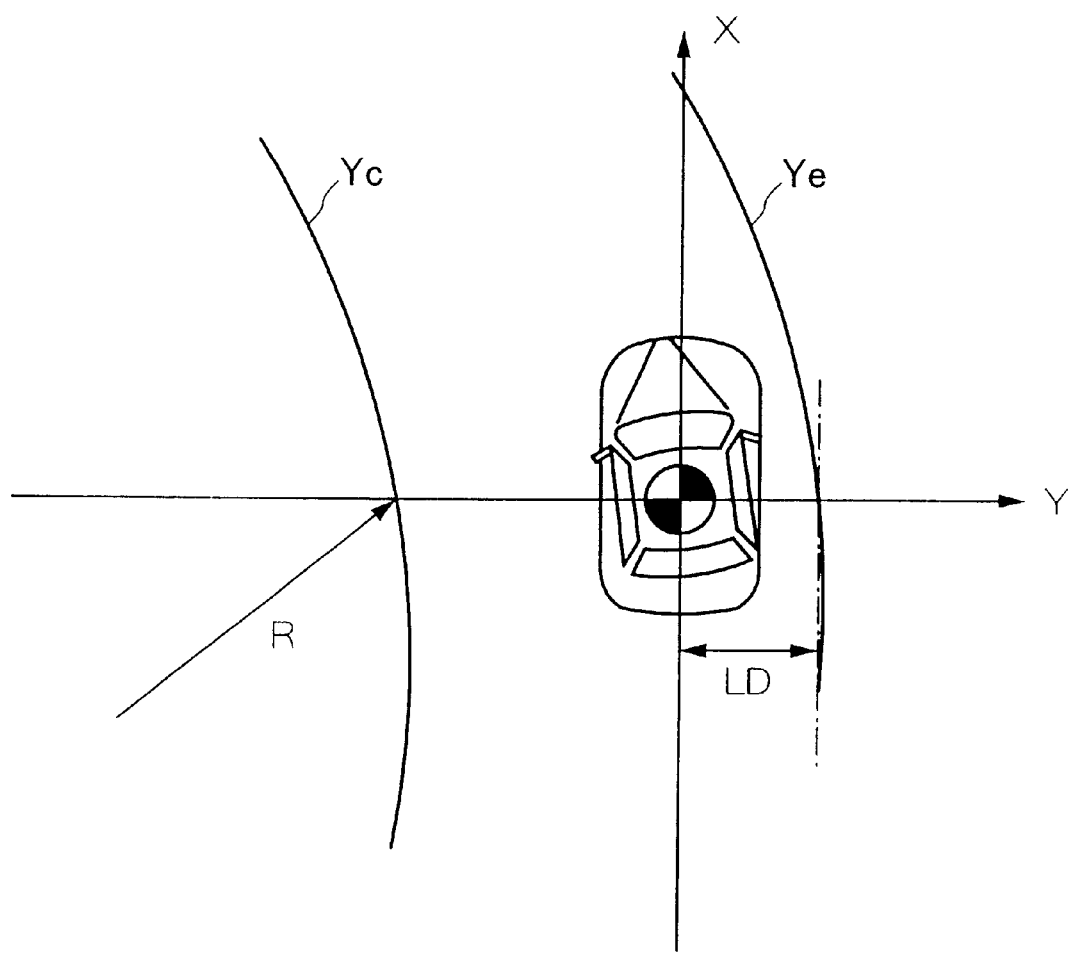
FIG. 10 is a graph showing a distance LD from the current position of a vehicle to a partitioning line Ye of a travel route.

The deviation warning commencement threshold value TH2 may, for example, be a predetermined threshold value for the above described lateral slippage amount Yd, or, as is shown in FIG. 10, may be a predetermined threshold value for the distance LD from the current position of the vehicle on the Y axis to the partitioning line Ye of the travel route.

Furthermore, in the present embodiment assistance is given to the steering torque Td of the driver, however, it is to be understood that the present invention may also be applied to what is known as automatic driving.

Figure 11:
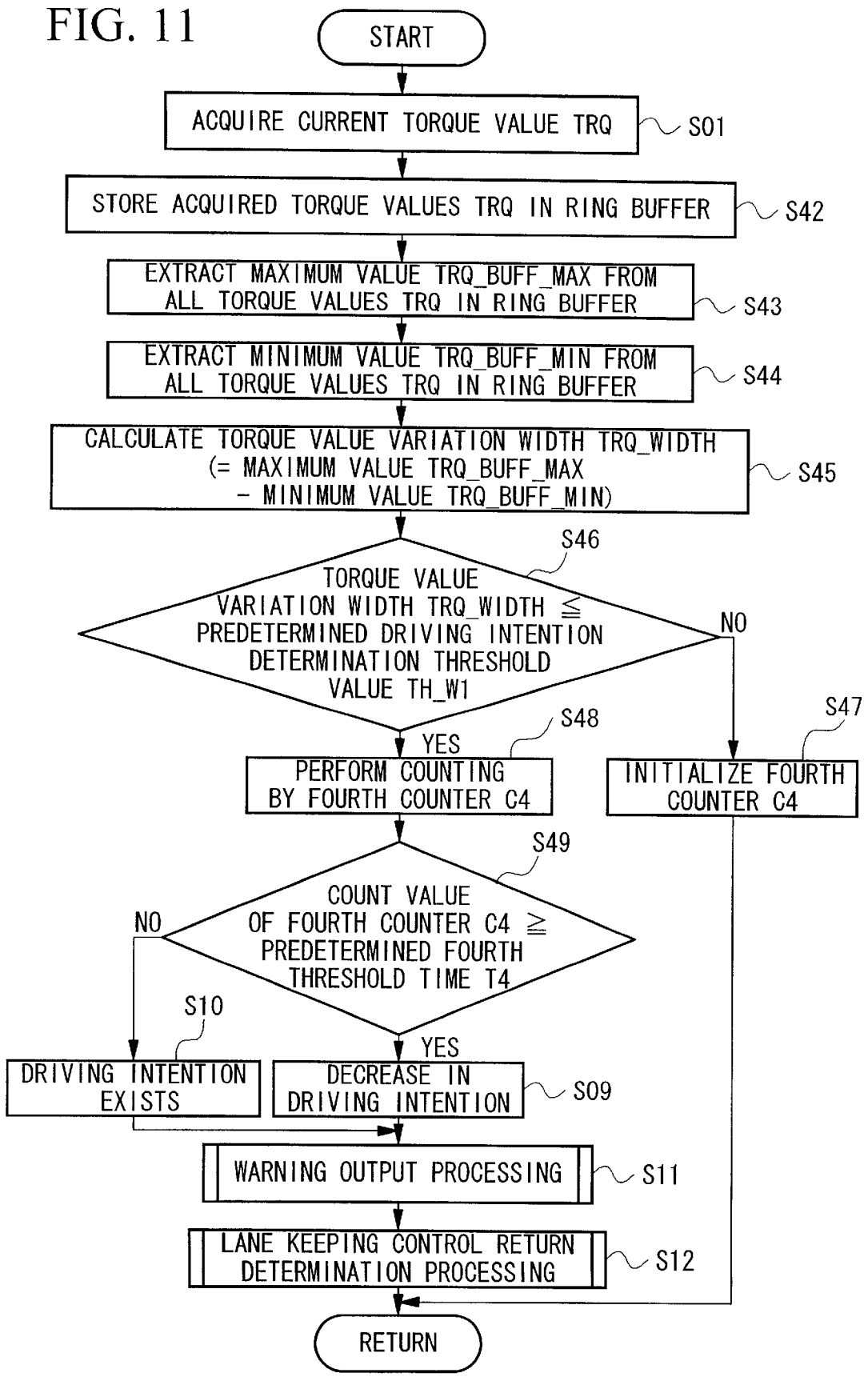
FIG. 11 is a flow chart showing the operation of the travel control apparatus for a vehicle according to a variant example of the present embodiment.

Note also that in the present embodiment it is determined whether there has been a decrease in the driving intention of the driver based on the torque value deviation sum value TRQDEF_SUM or the torque value deviation squared value sum value SQR_SUM, however, the present invention is not limited to this and, for example, as in the flow chart showing the operation of the vehicle steering control apparatus 10 according to a variant example of the present embodiment shown in FIG. 11, it is also possible to determine whether there has been a decrease in the driving intention of the driver based on the difference over a predetermined period between a maximum value and a minimum value of a detection signal of the steering torque Td output from the torque sensor 22. In this case, for example, instead of the processing of the above described steps S02 to S08, the processing of steps S42 to S49, described below, is executed. Note that the processing sequence described below, namely, step S01, steps S42 to S49, and steps S09 to S12 is repeated at predetermined interval (for example, every 10 ms).

For example, in step S42 shown in FIG. 11 an acquired current torque value TRQ is stored in a storage section (not shown) formed by a ring buffer. Here, in a ring buffer having a predetermined number of buffers that are able to be set appropriately, for example, if the ring buffer has 100 buffers, then in a processing sequence that is repeated at predetermined interval (for example, every 10 ms), data of 100 torque values TRQ for the previous one second is stored. In addition, the storage section is set such that each time new data is added the oldest data is deleted, resulting in 100 items of data for the most recent one second always being stored.

Next, in step S43 the maximum value TRQ_BUFF_MAX from all of the torque values TRQ stored in the storage section is extracted.

Next, in step S44 the minimum value TRQ_BUFF_MIN from all of the torque values TRQ stored in the storage section is extracted.

Next, in step S45 the minimum value TRQ_BUFF_MIN is subtracted from the maximum value TRQ_BUFF_MAX, thereby enabling the torque value variation width TRQ_WIDTH to be calculated.

Next, in step S46 it is determined whether the torque value variation width TRQ_WIDTH is less than or equal to a predetermined driving intention determination threshold value TH_W1 (for example, 2 kgf cm×9.8/100 N m).

If the result of this determination is "NO", the flow proceeds to step S47, the count value of a fourth counter C4 is set to "0", thereby initializing the count value, and the processing sequence is ended.

If, however, the result of the determination is "YES", the flow proceeds to step S48 and the counting by the fourth counter C4 is performed.

Next, in step S49 it is determined whether the count value of the fourth counter C4 is equal to or more than a predetermined fourth threshold time T4 (several seconds, for example, seven seconds).

If the result of this determination is "YES", the flow proceeds to the above described step S09.

If, however, the result of the determination is "NO", the flow proceeds to the above described step S10.

Note that, in step S46, in addition to the determination as to whether the torque value variation width TRQ_WIDTH is less than or equal to the predetermined driving intention determination threshold value TH_W1, in order to determine more accurately whether there has been a decrease in the driving intention, it is also possible to proceed further on to step S48 when the size of the current torque value TRQ is less than or equal to a predetermined driving intention determination threshold value TH_W2 (several kgf cm×9.8/100 N m, for example, 5 kgf cm×9.8/100 N m).

Moreover, in the present embodiment it is also possible to provide a determination processing step (not shown) in which it is determined whether there has been a decrease in the driving intention based on at least one of the torque value deviation sum value TRQDEF_SUM or the torque value deviation squared value sum value SQR_SUM, and the torque value variation width TRQ_WIDTH.

Namely, the processing sequence of steps S01 to S12 in the above described embodiment, and the processing sequences of steps S01, S42 to S49, and S09 to S12 in the above described variant example of the present embodiment are performed independently of each other, and in these determination processing steps it is determined whether there has been a decrease in the driving intention of the driver in accordance with a determination result of any of at least step S08 or step S49. In this case, in step S08 it is determined whether the count value of the first counter C1 is equal to or more than the predetermined first threshold time T1 (ten plus seconds to twenty plus seconds, for example, 20 seconds).

Further, in the above described variant example of the present embodiment, it is not limited to the torque value variation width TRQ_WIDTH, and it is also possible to determine whether there has been a decrease in the driving intention in accordance with the standard deviation in all of the torque values TRQ stored in the storage section, or with the standard deviation in the change amounts of the torque values TRQ.

In this case, for example, instead of the above described steps S43 to S46 there is provided a standard deviation determination step (not shown). In this standard deviation determination step, the standard deviation in all of the torque values TRQ stored in the storage section, or the standard deviation in the temporal change amounts of the torque values TRQ serving as time series data are calculated, and it is determined whether the absolute value of the current torque value TRQ is equal to or less than a predetermined value (for example, 2 kgf cm×9.8/100 N m), and also whether the standard deviation in the torque values TRQ is equal to or less than the predetermined driving intention determination threshold value TH_S1 (for example, 0.5 kgf cm×9.8/100 N m), or whether the standard deviation in the temporal change amounts of the torque values TRQ is equal to or less than the predetermined driving intention determination threshold value TH_S2 (for example, 0.5 kgf cm×9.8/100 N m). If the result of the determination is "NO" the flow proceeds to step S47. If, however, the result of the determination is "YES" the flow proceeds to step S48.

What is claimed is:

1. A steering control apparatus for a vehicle, comprising: an actuator that drives a steering mechanism capable of steering wheels of the vehicle; a torque detector that detects steering torque input by a driver; a travel route recognizing section that recognizes a travel route of the vehicle; and a steering assistance section that outputs a signal that drives the actuator such that the vehicle travels along the travel route recognized by the travel route recognizing section,
   wherein the steering control apparatus for a vehicle is provided with:
   a steering torque change state calculation section that calculates a moving integral value of a squared value of an amount of change in the steering torque detected by the torque detector;
   a driving intention determination section that determines whether there has been a decrease in the driving intention of the driver based on a result of a calculation by the steering torque change state calculation section;
   a notification section that outputs a warning to the driver; and
   an execution section that executes at least one of stopping the driving of the actuator by the steering assistance section and outputting the warning by the notification section when it is determined by the driving intention determination section that there has been a decrease in the driving intention.

2. The steering control apparatus for a vehicle according to claim 1, wherein the driving intention determination section determines that there has been a decrease in the driving intention when a state in which the result of a calculation by the steering torque change state calculation section is less than or equal to a predetermined value continues for a predetermined time or longer.

3. The steering control apparatus for a vehicle according to claim 1, wherein the execution section outputs the warning over a predetermined time from when it is determined by the driving intention determination section that there has been a decrease in the driving intention.

4. The steering control apparatus for a vehicle according to claim 1, wherein the execution section stops the driving of the actuator after the output of the warning by the notification section.

5. The steering control apparatus for a vehicle according to claim 1, wherein, after the driving of the actuator has been stopped, the driving of the actuator is recommenced when it is determined by the driving intention determination section that there has been no decrease in the driving intention.

6. The steering control apparatus for a vehicle according to claim 5, wherein the driving intention determination section determines whether there has been a decrease in the driving intention after a predetermined time has passed from when the driving of the actuator was stopped.

7. The steering control apparatus for a vehicle according to claim 1, wherein there is provided with a deviation warning notification section that recognizes a position of the vehicle in the widthwise direction on the travel route based on a result of a recognition made by the travel route recognizing section, and when the position of the vehicle reaches a predetermined reference position that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

8. A steering control apparatus for a vehicle, comprising: an actuator that drives a steering mechanism capable of steering wheels of the vehicle; a torque detector that detects steering torque input by a driver; a travel route recognizing section that recognizes a travel route of the vehicle; and a steering assistance section that outputs a signal that drives the actuator such that the vehicle travels along the travel route recognized by the travel route recognizing section, wherein the steering control apparatus for a vehicle is provided with:

a steering torque difference calculation section that calculates a difference between a maximum value and a minimum value in a predetermined period of the steering torque detected by the torque detector;

a driving intention determination section that determines whether there has been a decrease in the driving intention of the driver based on a result of a calculation by the steering torque difference calculation section;

a notification section that outputs a warning to the driver; and an execution section that executes at least one of stopping the driving of the actuator by the steering assistance section and outputting the warning by the notification section when it is determined by the driving intention determination section that there has been a decrease in the driving intention.

9. The steering control apparatus for a vehicle according to claim 8, wherein the driving intention determination section determines that there has been a decrease in the driving intention when a state in which the result of a calculation by the steering torque difference calculation section is less than or equal to a predetermined value continues for a predetermined time or longer.

10. The steering control apparatus for a vehicle according to claim 9, wherein the driving intention determination section determines that there has been a decrease in the driving intention when, in addition to the result of the calculation by the steering torque difference calculation section, a state in which the steering torque detected by the torque detector is less than or equal to a predetermined value continues for a predetermined time or longer.

11. The steering control apparatus for a vehicle according to claim 8, wherein the execution section outputs the warning over a predetermined time from when it is determined by the driving intention determination section that there has been a decrease in the driving intention.

12. The steering control apparatus for a vehicle according to claim 8, wherein the execution section stops the driving of the actuator after the output of the warning by the notification section.

13. The steering control apparatus for a vehicle according to claim 8, wherein, after the driving of the actuator has been stopped, the driving of the actuator is recommenced when it is determined by the driving intention determination section that there has been no decrease in the driving intention.

14. The steering control apparatus for a vehicle according to claim 13, wherein the driving intention determination section determines whether there has been a decrease in the driving intention after a predetermined time has passed from when the driving of the actuator was stopped.

15. The steering control apparatus for a vehicle according to claim 8, wherein there is provided with a deviation warning notification section that recognizes a position of the vehicle in the widthwise direction on the travel route based on a result of a recognition made by the travel route recognizing section, and when the position of the vehicle reaches a predetermined reference position that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

16. A steering control apparatus for a vehicle, comprising: an actuator that drives a steering mechanism capable of steering wheels of the vehicle; a torque detector that detects steering torque input by a driver; a travel route recognizing section that recognizes a travel route of the vehicle; and a steering assistance section that outputs a signal that drives the actuator such that the vehicle travels along the travel route recognized by the travel route recognizing section, wherein the steering control apparatus for a vehicle is provided with:

a steering torque change state calculation section that calculates one of a moving integral value of an amount of change in the steering torque detected by the torque detector and a moving integral value of a squared value of an amount of change in the steering torque detected by the torque detector;

a steering torque difference calculation section that calculates a difference between a maximum value and a minimum value of the steering torque detected by the torque detector in a predetermined period;

a first driving intention determination section that determines whether there has been a decrease in the driving intention of the driver based on a result of a calculation by the steering torque change state calculation section;

a second driving intention determination section that determines whether there has been a decrease in the driving intention of the driver based on a result of a calculation by the steering torque difference calculation section;

a driving intention determination section that determines whether there has been a decrease in the driving intention in accordance with at least the determination result by either of the first or second driving intention determination sections;

a notification section that outputs a warning to the driver; and an execution section that executes at least one of stopping the driving of the actuator by the steering assistance section and outputting the warning by the notification section when it is determined by the driving intention determination section that there has been a decrease in the driving intention.

17. The steering control apparatus for a vehicle according to claim 6, wherein the first driving intention determination section determines that there has been a decrease in the driving intention when a state in which the result of a calculation by the steering torque change state calculation section is less than or equal to a first predetermined value continues for a first predetermined time or longer, and the second driving intention determination section determines that there has been a decrease in the driving intention when a state in which the result of a calculation by the steering torque difference calculation section is less than or equal to a second predetermined value continues for a second predetermined time or longer.

18. The steering control apparatus for a vehicle according to claim 16, wherein the execution section outputs the warning over a predetermined time from when it is determined by the driving intention determination section that there has been a decrease in the driving intention.

19. The steering control apparatus for a vehicle according to claim 16, wherein the execution section stops the driving of the actuator after the output of the warning by the notification section.

20. The steering control apparatus for a vehicle according to claim 16, wherein, after the driving of the actuator has been stopped, the driving of the actuator is recommenced when it is determined by the driving intention determination section that there has been no decrease in the driving intention.

21. The steering control apparatus for a vehicle according to claim 20, wherein the driving intention determination section determines whether there has been a decrease in the driving intention after a predetermined time has passed from when the driving of the actuator was stopped.

22. The steering control apparatus for a vehicle according to claim 16, wherein there is provided with a deviation warning notification section that recognizes a position of the vehicle in the widthwise direction on the travel route based on a result of a recognition made by the travel route recognizing section, and when the position of the vehicle reaches a predetermined reference position that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

23. A steering control apparatus for a vehicle, comprising: an actuator that drives a steering mechanism capable of steering wheels of the vehicle; a torque detector that detects steering torque input by a driver; a travel route recognizing section that recognizes a travel route of the vehicle; and a steering assistance section that outputs a signal that drives the actuator such that the vehicle travels along the travel route recognized by the travel route recognizing section, wherein the steering control apparatus for a vehicle is provided with:
a standard deviation calculation section that calculates any of a standard deviation in the steering torques detected by the torque detector and a standard deviation in change amounts of the steering torque;
a driving intention determination section that determines whether there has been a decrease in the driving intention of the driver based on a result of a calculation by the standard deviation calculation section;
a notification section that outputs a warning to the driver; and
an execution section that executes at least one of stopping the driving of the actuator by the steering assistance section and outputting the warning by the notification section when it is determined by the driving intention determination section that there has been a decrease in the driving intention.

24. The steering control apparatus for a vehicle according to claim 23, wherein the driving intention determination section determines that there has been a decrease in the driving intention when a state in which the result of the calculation by the standard deviation calculation section is less than or equal to a predetermined value continues for a predetermined time or longer.

25. The steering control apparatus for a vehicle according to claim 23, wherein there is provided a determination section for determining whether a size of the steering torque detected by the torque detector is less than or equal to a predetermined value, and the driving intention determination section determines that there has been a decrease in the driving intention when the size of the steering torque in the result of the determination by the determination section is less than or equal to a predetermined value, and the result of the calculation by the standard deviation calculation section is less than or equal to a predetermined value.

26. The steering control apparatus for a vehicle according to claim 23, wherein the execution section outputs the warning over a predetermined time from when it is determined by the driving intention determination section that there has been a decrease in the driving intention.

27. The steering control apparatus for a vehicle according to claim 23, wherein the execution section stops the driving of the actuator after the output of the warning by the notification section.

28. The steering control apparatus for a vehicle according to claim 23, wherein, after the driving of the actuator has been stopped, the driving of the actuator is recommenced when it is determined by the driving intention determination section that there has been no decrease in the driving intention.

29. The steering control apparatus for a vehicle according to claim 28, wherein the driving intention determination section determines whether there has been a decrease in the driving intention after a predetermined time has passed from when the driving of the actuator was stopped.

30. The steering control apparatus for a vehicle according to claim 23, wherein there is provided with a deviation warning notification section that recognizes a position of the vehicle in the widthwise direction on the travel route based on a result of a recognition made by the travel route recognizing section, and when the position of the vehicle reaches a predetermined reference position that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

31. A steering control apparatus for a vehicle, comprising: an actuator that drives a steering mechanism capable of steering wheels of the vehicle; a torque detector that detects steering torque input by a driver; a travel route recognizing section that recognizes a travel route of the vehicle; and a steering assistance section that outputs a signal that drives the actuator such that the vehicle travels along the travel route recognized by the travel route recognizing section, wherein the steering control apparatus for a vehicle is provided with:

a steering torque change state calculation section that calculates a moving integral value of an amount of change in the steering torque detected by the torque detector;

a driving intention determination section that determines whether there has been a decrease in the driving intention of the driver based on a result of a calculation by the steering torque change state calculation section;

a notification section that outputs a warning to the driver; and an execution section that executes at least one of stopping the driving of the actuator by the steering assistance section and outputting the warning by the notification section when it is determined by the driving intention determination section that there has been a decrease in the driving intention, wherein, after the driving of the actuator has been stopped, the driving of the actuator is recommenced when it is determined by the driving intention determination section that there has been no decrease in the driving intention.

32. The steering control apparatus for a vehicle according to claim 31, wherein the driving intention determination section determines that there has been a decrease in the driving intention when a state in which the result of a calculation by the steering torque change state calculation section is less than or equal to a predetermined value continues for a predetermined time or longer.

33. The steering control apparatus for a vehicle according to claim 31, wherein the execution section outputs the warning over a predetermined time from when it is determined by the driving intention determination section that there has been a decrease in the driving intention.

34. The steering control apparatus for a vehicle according to claim 31, wherein the execution section stops the driving of the actuator after the output of the warning by the notification section.

35. The steering control apparatus for a vehicle according to claim 31, wherein the driving intention determination section determines whether there has been a decrease in the driving intention after a predetermined time has passed from when the driving of the actuator was stopped.

36. The steering control apparatus for a vehicle according to claim 31, wherein there is provided with a deviation warning notification section that recognizes a position of the vehicle in the widthwise direction on the travel route based on a result of a recognition made by the travel route recognizing section, and when the position of the vehicle reaches a predetermined reference position that shows a deviation from the travel route, the deviation warning notification section determines that a possibility exists that the vehicle has deviated from the travel route and outputs a deviation warning, and wherein when it is determined by the driving intention determination section that there has been a decrease in the driving intention, the deviation warning notification section alters the reference position such that it is frequently determined that a possibility exists that the vehicle has deviated from the travel route.

* * * * *